Patented Aug. 11, 1936

2,050,788

UNITED STATES PATENT OFFICE 2,050,788

PROCESS FOR THE PRODUCTION OF HIGHER ALCOHOLS FROM A MIXTURE OF ETHYL ALCOHOL AND METHYL ALCOHOL

Otto Fuchs and Wilhelm Querfurth, Constance, Germany

No Drawing. Application June 8, 1932, Serial No. 616,158. In Great Britain June 24, 1931

22 Claims. (Cl. 260—156)

It is well known that when ethyl alcohol is passed over dehydrogenating or dehydrating catalysts at high temperatures there are obtained condensation products, which differ according to the prevailing conditions, as for example esters such as ethyl acetate, ketones such as acetone, and higher alcohols such as butyl alcohol.

It is also known that when methyl alcohol is passed together with hydrogen and carbon monoxide over catalysts under high pressures at elevated temperatures a mixture of products is formed consisting of higher alcohols together with esters, ketones, hydrocarbons, etc.

We have now found that the undesirable secondary reactions which take place in the aforementioned process and which give rise to the formation of products other than alcohols may be avoided and that high yields of higher alcohols may be obtained from a mixture of ethyl and methyl alcohol. According to the present invention the vapors of methyl and ethyl alcohols are subjected at high temperatures and at ordinary or super-atmospheric pressure to the action of catalysts consisting essentially of an earth metal oxide (particularly magnesia) activated by the presence of relatively small quantities of metal oxides or metals as disclosed for example in U. S. A. patent-application 551,040. Such activators are the metals and the oxides and hydroxides thereof, namely, lead, thorium, silver, uranium, cadmium, tin, chromium, manganese, zinc, iron, nickel, cobalt and copper. They may be used singly or in mixtures. Addition of such activating compounds not only increases the yields of higher alcohols but enables the reaction temperature to be lower than would otherwise be possible, as for example below 400° C., and preferably between 200° C. and 350° C.

The employment of hydrogen renders it possible in preparing the composite contact substances to employ as activators metal oxides or hydroxides or similar reducible compounds obtained in any desired manner. A large number of compounds are suitable for these admixtures, e. g. lead oxide, thorium oxide, silver oxide, uranium oxide, cadmium oxide, tin oxide, chromium oxide, manganese oxide, zinc oxide, iron oxide, nickel oxide, cobalt oxide and copper oxide. Mixed activators consisting of two or more of these compounds can also be employed with advantage.

All the activators whether used alone or in admixtures are effective in small amounts relatively to the magnesia—e. g. quite a low percentage of the total composition—and the limitation of such activators to small amounts such as for example less than 10 per cent. of the total composition of the catalysts is important for carrying out the reaction as in large amounts they favor the yield of by-products and decomposition gases from the higher alcohols.

We have further found, that the functional life of the catalysts is favorably influenced by admixture of substances that have no specific catalytic effect but a stabilizing influence, such as the oxides or hydroxides of aluminium or other earth metals such as titanium, thorium or the like.

Substances such as aluminium oxide have a favorable effect not only on the activity but also on the mechanical efficiency of the catalyst. A catalyst may, for example, be prepared as follows: The magnesia is mixed with copper oxide and aluminium hydroxide is added with as much water as will produce a well kneadable paste and this paste is, after being kneaded, dried on plates. The fragments obtained on breaking up the dried mass—into fragments of the size of peas, for example—have a considerable mechanical strength which remains even after prolonged use.

The aluminium oxide can obviously be replaced by similarly acting substances, such for example as stannic acid gel. Silica gel may also be employed, in which case it is, moreover, not at all necessary to use a still doughy hydroxide. Very good results are obtained with an ordinary commercial granular silica gel which is added in a fairly finely ground condition in quantities of 8 to 10 per cent. on mixing the catalyst. Stabilizing substances of an entirely different kind are also capable of exerting a similar action, e. g. a finely powdered wood charcoal that is poor in ash can be added in quantities of 12 per cent.—and produce similarly good results with regard to the functional life and mechanical strength of the catalyst.

The catalyst employed, like all catalysts used in such organic reactions, from time to time requires purification by treatment with oxidizing gases and steam at temperature of, for example 300 to 500° C., and in spite of the fact that the wood charcoal is mainly consumed during purification its stabilizing effect on the course of the reaction and on the mechanical strength of the catalyst, remains. Obviously, therefore, all the substances mentioned serve to stabilize for a long time the initial surface activity that is favorable to the reaction, in spite of the temporary employment of temperatures up to 500° C. in purifying the catalyst, for example.

Freshly-mixed catalysts are, advantageously, before being used for the first time, likewise subjected to a short treatment with moist gases containing oxygen, because they are then capable of immediately exerting their full catalytic action.

We prefer as range of ratios of hydrogen to the mixture of alcohols from half a molecule hydrogen per molecule alcohols to three molecules hydrogen per molecule alcohols. A larger excess of hydrogen may however be employed. Methyl and ethyl alcohol may be mixed in any proportions.

As already mentioned the pressure employed may be atmospheric or super-atmospheric. The products of the reaction consists of higher alcohols which in the case of operating at atmospheric pressure are substantially free from esters, ketones and so forth, and according to the proportions of methyl and ethyl alcohol employed the composition of the products formed may vary. Alcohols containing an uneven number of carbon atoms such as propyl alcohol, amyl alcohol and so forth are always produced together with alcohols such as butyl alcohol, hexyl alcohol and the like, containing an even number of carbon atoms.

In order that the invention may be clearly understood and readily carried into effect we will now describe the same more fully with reference to the following examples of procedure according to the invention:

*Example I.*—The catalyst employed was produced from the oxides of magnesium, aluminium and copper in the proportion of 89:8:3. It was placed in an electrically heated tube. Working at ordinary pressure and at a temperature of 260° C. a mixture of methyl alcohol, ethyl alcohol and hydrogen in the proportion of 1,4:1:3 molecules was passed over the catalyst. In the resultant product, there were found after separating off the portions of unchanged methyl alcohol and ethyl alcohol as well as small quantities of acetaldehyde and butyraldehyde which, together with the unchanged alcohols, can again be supplied to the reaction, the following relative yields of higher alcohols:

| | Parts by weight |
|---|---|
| Normal propyl alcohol | 14 |
| Isobutyl alcohol | 18 |
| Normal butyl alcohol | 29 |
| Methyl ethyl carbin carbinol (racemic form of the optically active amyl alcohol) | 22 |
| Hexyl alcohol fraction | 8 |
| Higher alcohols consisting of heptyl, octyl and nonyl alcohols | 16 |

The employment of moderate super-atmospheric pressure favours the conversion. The alcohols are then more completely converted into the desired products on a single passage over the catalyst. Again, when using increased pressure, it is possible to reduce the proportion of hydrogen in the reaction mixture without increasing the relative production of aldehydes as by-products of the reaction; in fact such production is even substantially diminished. The most favorable reaction temperatures when working with pressure are generally higher than when working without pressure—generally speaking above 300° C.

*Example II.*—A mixture composed of 4,4 molecules of methyl alcohol, 3 molecules of ethyl alcohol and 3 molecules of hydrogen was passed over the same catalyst as in Example I but at a temperature of 350° C. and under a pressure of 30 atmospheres. After separating off the unchanged alcohols mixed with small quantities of aldehydes and acetic ether, the following quantities of the different higher alcohols were found:

| | Parts by weight |
|---|---|
| Normal propyl alcohol | 361 |
| Isobutyl alcohol | 322 |
| Normal butyl alcohol | 119 |
| Methyl ethyl carbin carbinol | 339 |
| Higher boiling point alcohols | 549 |

In the following claims the term "earth metals" is intended to include the metals of the 3rd and 4th groups of the periodic system.

Having now particularly described and ascertained the nature of our said invention and in what manner the same is to be performed, we declare that what we claim is:

1. A process of producing higher aliphatic alcohols comprising passing a vaporous mixture of ethyl alcohol and methyl alcohol in conjunction with hydrogen over heated catalytic material comprising essentially magnesia as the preponderating constituent and a catalytically active metal compound taken from a group consisting of lead oxide, thorium oxide, silver oxide, uranium oxide, cadmium oxide, tin oxide, manganese oxide, zinc oxide, iron oxide, nickel oxide, cobalt oxide and copper oxide as the second constituent and at a temperature between 200° C. and 400° C.

2. A process of producing higher aliphatic alcohols comprising passing a vaporous mixture of ethyl alcohol and methyl alcohol in conjunction with hydrogen over heated catalytic material comprising essentially magnesia as the preponderating constituent and a reducible copper compound as the second constituent and at a temperature between 200° C. and 400° C.

3. A process of producing higher aliphatic alcohols comprising passing a vaporous mixture of ethyl alcohol and methyl alcohol in conjunction with hydrogen over heated catalytic material comprising essentially magnesia as the preponderating constituent, copper oxide and aluminum oxide as further constituents, at pressures from 10 to 40 atmospheres and temperatures from 250 to 350° centigrade, separating out the higher aliphatic alcohols and re-using the remaining mixture containing the unchanged initial alcohols and some aldehyde as initial material in continued operation.

4. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide, and a stabilizer taken from a group consisting of oxides of the earth metals, hydroxides of the earth metals, stannic acid gel and silica gel.

5. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, and an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide.

6. A process of producing higher aliphatic alcohols comprising passing a vaporous mixture of ethyl alcohol and methyl alcohol in conjunction with hydrogen over a heated catalytic material comprising magnesia as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide, and a stabilizer taken from a group consisting of oxides of the earth metals, hydroxides of the earth metals, stannic acid gel, and silica gel.

7. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, an oxide taken from a group consisting of lead oxide, thorium oxide, silver oxide, uranium oxide, cadamium oxide, tin oxide, chromium oxide, manganese oxide, zinc oxide, iron oxide, nickel oxide, cobalt oxide and copper oxide, and aluminum oxide as a stabilizer.

8. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and silica gel as a stabilizer.

9. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, copper oxide as an activator and a stabilizer taken from a group consisting of oxides of the earth metals, hydroxides of the earth metals, stannic acid gel and silica gel.

10. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, silver oxide as an activator and a stabilizer taken from a group consisting of oxides of the earth metals, hydroxides of the earth metals, stannic acid gel and silica gel.

11. A process of producing higher aliphatic alcohols comprising passing a vaporous mixture of ethyl alcohol and methyl alcohol in conjunction with hydrogen over a heated catalytic material comprising magnesia as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and aluminum oxide as a stabilizer.

12. A process of producing higher aliphatic alcohols comprising passing a vaporous mixture of ethyl alcohol and methyl alcohol in conjunction with hydrogen over a heated catalytic material comprising magnesia as the preponderant constituent, an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide and copper oxide and silica gel as a stabilizer.

13. A process of producing higher aliphatic alcohols comprising passing a vaporous mixture of ethyl alcohol and methyl alcohol in conjunction with hydrogen over a heated catalytic material comprising magnesia as the preponderant constituent, copper oxide as an activator and a stabilizer taken from a group consisting of oxides of the earth metals, hydroxides of the earth metals, stannic acid gel and silica gel.

14. A process of producing higher aliphatic alcohols comprising passing a vaporous mixture of ethyl alcohol and methyl alcohol in conjunction with hydrogen over a heated catalytic material comprising magnesia as the preponderant constituent, silver oxide as an activator and a stabilizer taken from a group consisting of oxides of the earth metals, hydroxides of the earth metals, stannic acid gel and silica gel.

15. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, copper oxide as an activator and aluminum oxide as a stabilizer.

16. A process of producing higher aliphatic alcohols comprising passing a vaporous mixture of ethyl alcohol and methyl alcohol in conjunction with hydrogen over a heated catalytic material comprising an alkaline earth metal oxide as the preponderant constituent, copper oxide as an activator and silica gel as a stabilizer.

17. A process of producing higher aliphatic alcohols comprising passing a vaporous mixture of ethyl alcohol and methyl alcohol in conjunction with hydrogen over a heated catalytic material comprising magnesia as the preponderant constituent and silver oxide as the activator.

18. A process of producing higher aliphatic alcohols comprising passing a vaporous mixture of ethyl alcohol and methyl alcohol in conjunction with hydrogen over a heated catalytic material comprising magnesia as the preponderant constituent and an oxide taken from a group consisting of lead oxide, thorium oxide, silver oxide, uranium oxide, cadmium oxide, tin oxide, chromium oxide, manganese oxide, zinc oxide, iron oxide, nickel oxide, cobalt oxide, and copper oxide.

19. A process of producing higher aliphatic alcohols comprising passing a vaporous mixture of ethyl alcohol and methyl alcohol in conjunction with hydrogen over a heated catalytic material comprising magnesia as the preponderant constituent, copper oxide as an activator and silica gel as a stabilizer.

20. A process of producing higher aliphatic alcohols comprising passing a vaporous mixture of ethyl alcohol and methyl alcohol in conjunction with hydrogen over a heated catalytic material comprising magnesia as the preponderant constituent and copper oxide as the second constituent.

21. A process of producing higher aliphatic alcohols comprising passing a vaporous mixture of ethyl alcohol and methyl alcohol in conjunction with hydrogen over a heated catalytic material comprising magnesia as the preponderant constituent, copper oxide and aluminum oxide as further constituents.

22. A process of producing higher aliphatic alcohols comprising passing a vaporous mixture of ethyl alcohol and methyl alcohol in conjunction with hydrogen over a heated catalytic material comprising magnesia as the preponderant constituent, copper oxide and aluminum oxide as further constituents at operating temperatures between 200° and 400° C., separating out the higher aliphatic alcohols and reusing the remaining mixture as initial materials in continued operation.

OTTO FUCHS.
WILHELM QUERFURTH.